US012746690B2

(12) United States Patent
Kanamura et al.

(10) Patent No.: US 12,746,690 B2
(45) Date of Patent: Sep. 29, 2026

(54) APPARATUS CONTROL DEVICE, APPARATUS CONTROL METHOD, AND RECORDING MEDIUM

(71) Applicant: CASIO COMPUTER CO., LTD., Tokyo (JP)

(72) Inventors: Toshiaki Kanamura, Tokyo (JP); Kayoko Onoda, Tokyo (JP); Wataru Nimura, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 89 days.

(21) Appl. No.: 18/892,907

(22) Filed: Sep. 23, 2024

(65) Prior Publication Data

US 2025/0103050 A1 Mar. 27, 2025

(30) Foreign Application Priority Data

Sep. 25, 2023 (JP) ................................ 2023-161570

(51) Int. Cl.
*B25J 13/00* (2006.01)
*B25J 11/00* (2006.01)
(Continued)

(52) U.S. Cl.
CPC ......... *B25J 13/003* (2013.01); *B25J 11/0035* (2013.01); *G05D 1/243* (2024.01); *G05D 2105/32* (2024.01); *G05D 2111/20* (2024.01)

(58) Field of Classification Search
CPC ........ G05D 1/243; G05D 1/65; G05D 1/2285; G05D 2105/32; G05D 2111/20; A63H 2200/00; A63H 11/00; G05B 2219/35453; G05B 2219/23386; G05B 2219/36488; B25J 9/0003; B25J 9/0006; B25J 9/1679;
(Continued)

(56) References Cited

U.S. PATENT DOCUMENTS

2019/0389058 A1* 12/2019 Hayashi ............... G05D 1/0088
2021/0023704 A1 1/2021 Totsuka et al.

FOREIGN PATENT DOCUMENTS

JP H03123581 A 5/1991
JP H08318053 A 12/1996
(Continued)

OTHER PUBLICATIONS

Boukheddimi et al., "Robot Dance Generation with Music Based Trajectory Optimization", Oct. 2022, IEEE/RSJ International Conference on Intelligent Robots and Systems (IROS), pp. 3069-3076 (Year: 2022).*

(Continued)

*Primary Examiner* — Spencer D Patton
(74) *Attorney, Agent, or Firm* — Scully, Scott, Murphy & Presser, P.C.

(57) ABSTRACT

An apparatus control device for controlling an apparatus includes at least one processor configured to determine a characteristic of performance sound around a robot that is the apparatus, determine a situation of the robot or a situation around the robot, and when causing the robot to execute a performance coordinated action that is coordinated with the performance sound based on the determined characteristic of the performance sound, reflect the determined situation to the performance coordinated action.

11 Claims, 10 Drawing Sheets

(51) Int. Cl.
*G05D 1/243* (2024.01)
*G05D 105/30* (2024.01)
*G05D 111/20* (2024.01)

(58) Field of Classification Search
CPC ..... B25J 11/0005; B25J 11/001; B25J 11/003; B25J 11/0035; B25J 11/004; B25J 13/003
See application file for complete search history.

(56) References Cited

FOREIGN PATENT DOCUMENTS

| | | | |
|---|---|---|---|
| JP | 2001179665 | A | 7/2001 |
| JP | 2002331175 | A | 11/2002 |
| JP | 2003191187 | A | 7/2003 |
| JP | 2004066351 | A | 3/2004 |
| JP | 2004089542 | A | 3/2004 |
| JP | 2005231012 | A | 9/2005 |
| JP | 2005297095 | A | 10/2005 |
| JP | 2009050471 | A | 3/2009 |
| JP | WO2011070670 | A1 | 6/2011 |
| JP | 2017196675 | A | 11/2017 |
| JP | 6575637 | B2 | 9/2019 |
| JP | 2019217122 | A | 12/2019 |

OTHER PUBLICATIONS

Xia et al., "Autonomous Robot Dancing Driven by Beats and Emotions of Music", Jun. 2012, Proceedings of the 11th International Conference on Autonomous Agents and Multiagent Systems (AAMAS 2012), pp. 205-212 (Year: 2012).*
Office Action dated Dec. 3, 2025 received in U.S. Appl. No. 18/893,117.

* cited by examiner

FIG. 6

124

| CONTROL CONDITION | CONTROL DATA |
|---|---|
| BODY IS PETTED | MOTION DATA<br>0:0:0<br>500:60:0<br>1000:60:60<br>1500:60:−60<br>2000:60:60<br>2500:60:−60<br><br>SOUND EFFECT DATA<br>HAPPY SOUND |
| HEARD LOUD SOUND | MOTION DATA<br>0:0:0<br>100:60:0 |
| SPOKEN TO | SOUND EFFECT DATA<br>CHEERFUL SOUND |
| BREATHING CYCLE ELAPSED | MOTION DATA<br>0:0:0<br>1000:10:0<br>2000:0:0<br>3000:10:0<br>4000:0:0<br>5000:10:0<br>6000:0:0 |
| ⋮ | ⋮ |

FIG. 9

COORDINATED ACTION ADJUSTMENT TABLE

| ROBOT SITUATION | | CONTROL COEFFICIENT | | | | |
|---|---|---|---|---|---|---|
| | | UP/DOWN | | LEFT/RIGHT | | TIMING |
| | | SPEED | ACTION VOLUME | SPEED | ACTION VOLUME | |
| (1) EMOTION | HAPPY | +0.2 | +0.2 | +0.2 | +0.2 | ±0 |
| | UPSET | +0.1 | ±0 | +0.2 | ±0 | ±0 |
| | SAD | −0.1 | −0.1 | −0.1 | −0.1 | ±0 |
| | UNINTERESTED | −0.2 | −0.2 | −0.2 | −0.2 | −0.1 |
| | : | : | : | : | : | : |
| (2) PERSONALITY | CHIPPER | +0.2 | +0.2 | +0.2 | +0.2 | ±0 |
| | ACTIVE | +0.2 | +0.2 | +0.2 | +0.2 | +0.1 |
| | SHY | ±0 | ±0 | −0.1 | −0.1 | ±0 |
| | SPOILED | −0.1 | −0.1 | −0.1 | −0.1 | −0.1 |
| (3) REMAINING BATTERY LEVEL | 70% OR GREATER | +0.1 | ±0 | +0.1 | ±0 | ±0 |
| | 30-70% | ±0 | ±0 | ±0 | ±0 | ±0 |
| | 30% OR LESS | −0.1 | −0.1 | −0.1 | −0.1 | −0.1 |
| (4) ATTITUDE | CUDDLED | −0.1 | −0.1 | −0.1 | −0.1 | −0.1 |
| | TURNED OVER | −0.2 | −0.2 | −0.2 | −0.2 | −0.2 |
| | UPSIDE DOWN | −0.3 | −0.2 | −0.2 | −0.2 | −0.2 |
| (5) LOCATION | HOME | ±0 | ±0 | ±0 | ±0 | ±0 |
| | FREQUENTLY VISITED PLACE | ±0 | ±0 | ±0 | ±0 | ±0 |
| | RARELY VISITED PLACE | −0.1 | −0.1 | −0.1 | −0.1 | −0.1 |
| | FIRST VISITED PLACE | −0.2 | −0.2 | −0.2 | −0.2 | −0.2 |
| (6) CURRENT TIME | AFTER WAKE-UP | −0.2 | −0.2 | −0.2 | −0.2 | −0.2 |
| | NAPTIME | −0.1 | −0.1 | −0.1 | −0.1 | −0.1 |
| | BEFORE SLEEP | −0.1 | −0.1 | −0.1 | −0.1 | −0.1 |
| (7) EMOTION OF NEARBY ROBOT | HAPPY | +0.2 | +0.2 | +0.2 | +0.2 | ±0 |
| | UPSET | +0.1 | ±0 | +0.2 | ±0 | ±0 |
| | SAD | −0.1 | −0.1 | −0.1 | −0.1 | ±0 |
| | UNINTERESTED | −0.2 | −0.2 | −0.2 | −0.2 | −0.1 |
| | : | : | : | : | : | : |

APPARATUS CONTROL DEVICE, APPARATUS CONTROL METHOD, AND RECORDING MEDIUM

CROSS-REFERENCE TO RELATED APPLICATION

This application claims the benefit of Japanese Patent Application No. 2023-161570, filed on Sep. 25, 2023, the entire disclosure of which is incorporated by reference herein.

FIELD OF THE INVENTION

The present disclosure relates to an apparatus control device, an apparatus control method, and a recording medium.

BACKGROUND OF THE INVENTION

Apparatuses, such as toys and pet-type robots, that operate in response to sound are known. For example, Japanese Patent Application Publication No. H3-123581 discloses an actuation apparatus that samples sounds detected by a sound sensor to determine a change in rhythm from the sound volume and operates an actuator in a motion pattern based on the change in rhythm.

SUMMARY OF THE INVENTION

In the actuation apparatus disclosed in Japanese Patent Application Publication No. H3-123581, the motion pattern does not change when the rhythm of the detected sound remains constant, which results in monotonous actions that could easily lead to user boredom.

One aspect of an apparatus control device for controlling an apparatus according to the present disclosure includes at least one processor configured to

- determine a characteristic of a performance sound around the apparatus,
- determine a situation of the apparatus or a situation around the apparatus, and
- reflect, when causing the apparatus to execute a coordinated action that is coordinated with the performance sound based on the determined characteristic of the performance sound, the determined situation in the coordinated action.

BRIEF DESCRIPTION OF DRAWINGS

A more complete understanding of this application can be obtained when the following detailed description is considered in conjunction with the following drawings, in which:

FIG. 6 is a diagram for explaining an example of a control content table according to the embodiment;

FIG. 9 is a diagram of a coordinated action adjustment table according to the embodiment;

DETAILED DESCRIPTION OF THE INVENTION

Figure 1:
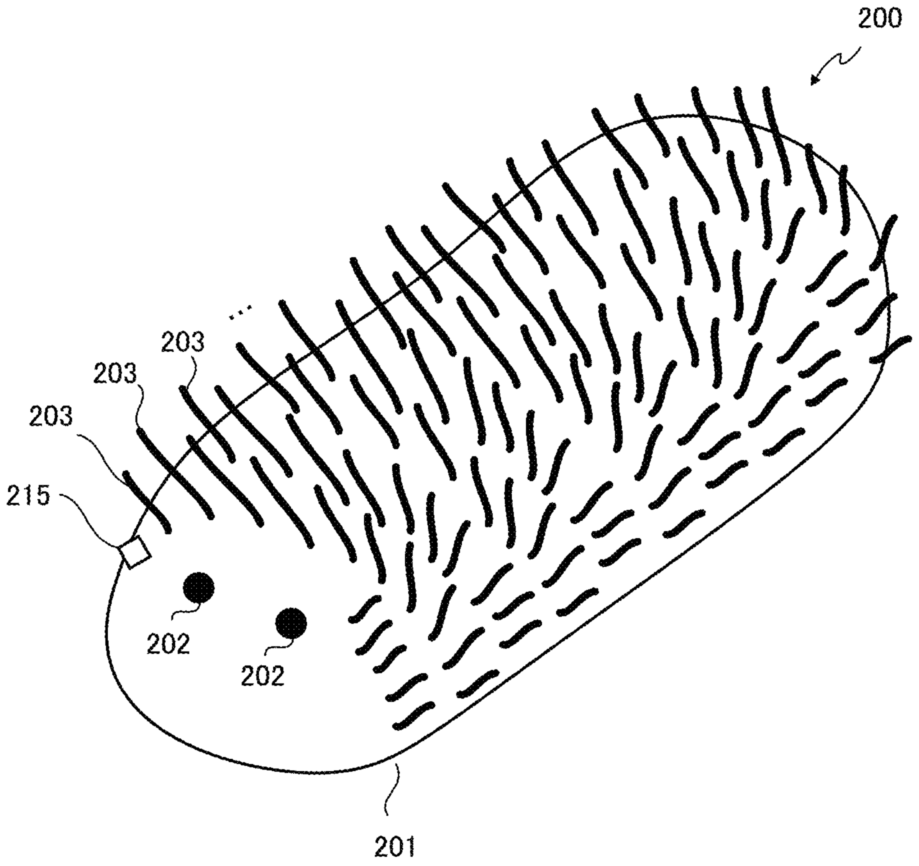
FIG. 1 is a diagram illustrating an appearance of a robot according to an embodiment.

Hereinafter, embodiments of the present disclosure are described with reference to the drawings. The same or corresponding parts are provided with the same reference symbol in the drawings.

Embodiments

Figure 2:
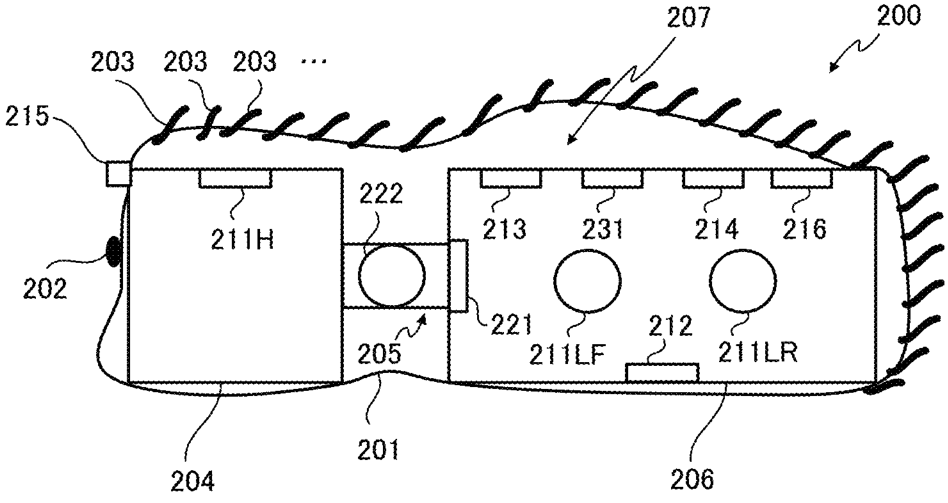
FIG. 2 is a sectional view of the robot according to the embodiment as viewed from the side.

An embodiment in which an apparatus control device according to the present disclosure is applied to a robot 200 that is an example of a performance information acquisition device illustrated in FIG. 1 is described with reference to the drawings. As illustrated in FIG. 1, the robot 200 according to the embodiment is a pet robot that resembles a small animal. The robot 200 is covered with an exterior 201 provided with bushy fur 203 and decorative parts 202 resembling eyes. A housing 207 of the robot 200 is accommodated in the exterior 201. As illustrated in FIG. 2, the housing 207 of the robot 200 includes a head 204, a coupler 205, and a torso 206, and the coupler 205 couples the head 204 to the torso 206.

As illustrated in FIG. 2, the torso 206 is provided with a servo motor called a twist motor 221 at a front end of the torso 206, and the head 204 is coupled to the front end of the torso 206 via the coupler 205. Moreover, the coupler 205 is provided with a servo motor called a vertical motor 222. Although the twist motor 221 is provided in the torso 206 in FIG. 2, the twist motor 221 may be provided in the coupler 205 or may be provided in the head 204. Additionally, in FIG. 2, the vertical motor 222 is provided on the coupler 205, but may be provided on the torso 206 or on the head 204. In any case, the twist motor 221 and the vertical motor 222 are provided inside the housing 207.

The twist motor 221 can rotate the head 204 at a rotational speed with respect to the torso 206 around a first rotational axis that passes through the coupler 205 and extends in the front-back direction of the torso 206. Additionally, the vertical motor 222 can rotate the head 204 upward and downward at a rotational speed with respect to the torso 206 around a second rotational axis that passes through the coupler 205 and extends in the width direction of the torso 206.

Figure 3:
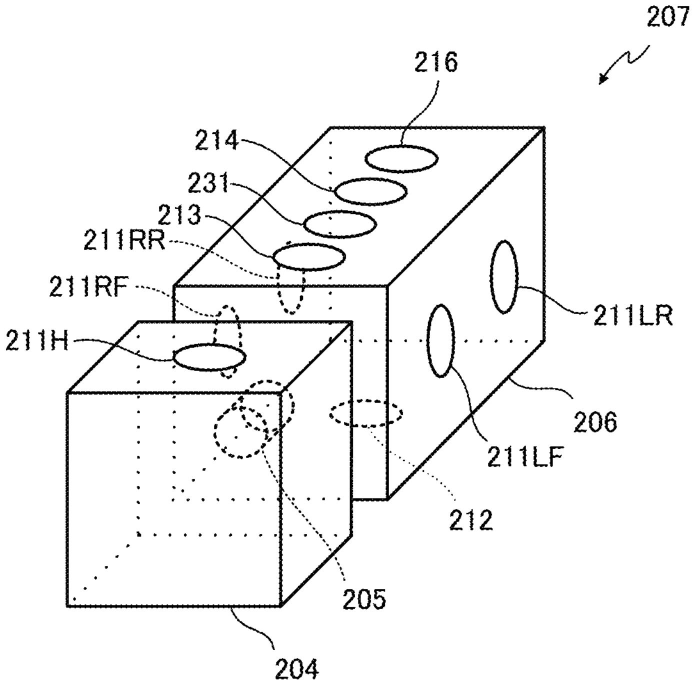
FIG. 3 is a diagram for explaining a housing of the robot according to the embodiment.

The robot 200 includes a touch sensor 211 that can detect petting or striking of the robot 200 by a user. More specifically, as illustrated in FIG. 2, the robot 200 includes a touch sensor 211H on the head 204. The touch sensor 211H can detect petting or striking of the head 204 by the user. Additionally, as illustrated in FIGS. 2 and 3, the robot 200 includes a touch sensor 211LF and a touch sensor 211LR respectively on the front and rear of a left-side surface of the torso 206, and a touch sensor 211RF and a touch sensor 211RR respectively on the front and rear of a right-side surface of the torso 206. These touch sensors 211LF, 211LR, 211RF, 211RR can detect petting or striking of the torso 206 by the user.

The robot 200 also includes an acceleration sensor 212 in the torso 206 in order to detect an attitude (orientation) of the robot 200 or to detect the robot 200 being picked up, the orientation being changed, the robot 200 being thrown by a user. The robot 200 includes a gyrosensor 213 on the torso 206. The gyrosensor 213 can detect vibrating, rolling, rotating, and the like of the robot 200.

The robot 200 also includes a microphone 214 in the torso 206 in order to detect an external sound. As illustrated in FIG. 2, the microphone 214 is provided at a position of a surface of the housing 207, suitable for an acquiring external environmental sound. Additionally, the microphone 214 may have directionality having sound collection characteristics that makes it less likely to pick up the sound of the servo motors (the twist motor 221 and the vertical motor 222).

The robot 200 includes an illuminance sensor 215 on the surface of the exterior 201 and the illuminance 215 can sense the surrounding brightness. The decorative part 202 may be configured by the illuminance sensor 215.

The robot 200 includes a position sensor 216 with a GPS module on the torso 206 and the position sensor 216 can acquire location information of the robot 200.

Furthermore, the robot 200 includes a speaker 231 on the torso 206 and can emit animal sounds, sing songs, and the like using the speaker 231.

In the present embodiment, the acceleration sensor 212, the gyrosensor 213, the microphone 214, the illuminance sensor 215, the position sensor 216, and the speaker 231 are provided on the torso 206, but all or a portion of these components may be provided on the head 204. In addition to the acceleration sensor 212, the gyrosensor 213, the microphone 214, the illuminance sensor 215, the position sensor 216, and the speaker 231 provided on the torso 206, all or a portion of these components may also be provided on the head 204. The touch sensor 211 is respectively provided on the head 204 and the torso 206, but a configuration is possible in which the touch sensor 211 is provided on only one of the head 204 and the torso 206. Alternatively, a plurality of touch sensors 211 may be provided in one or both of the head 204 and the torso 206.

Figure 4:
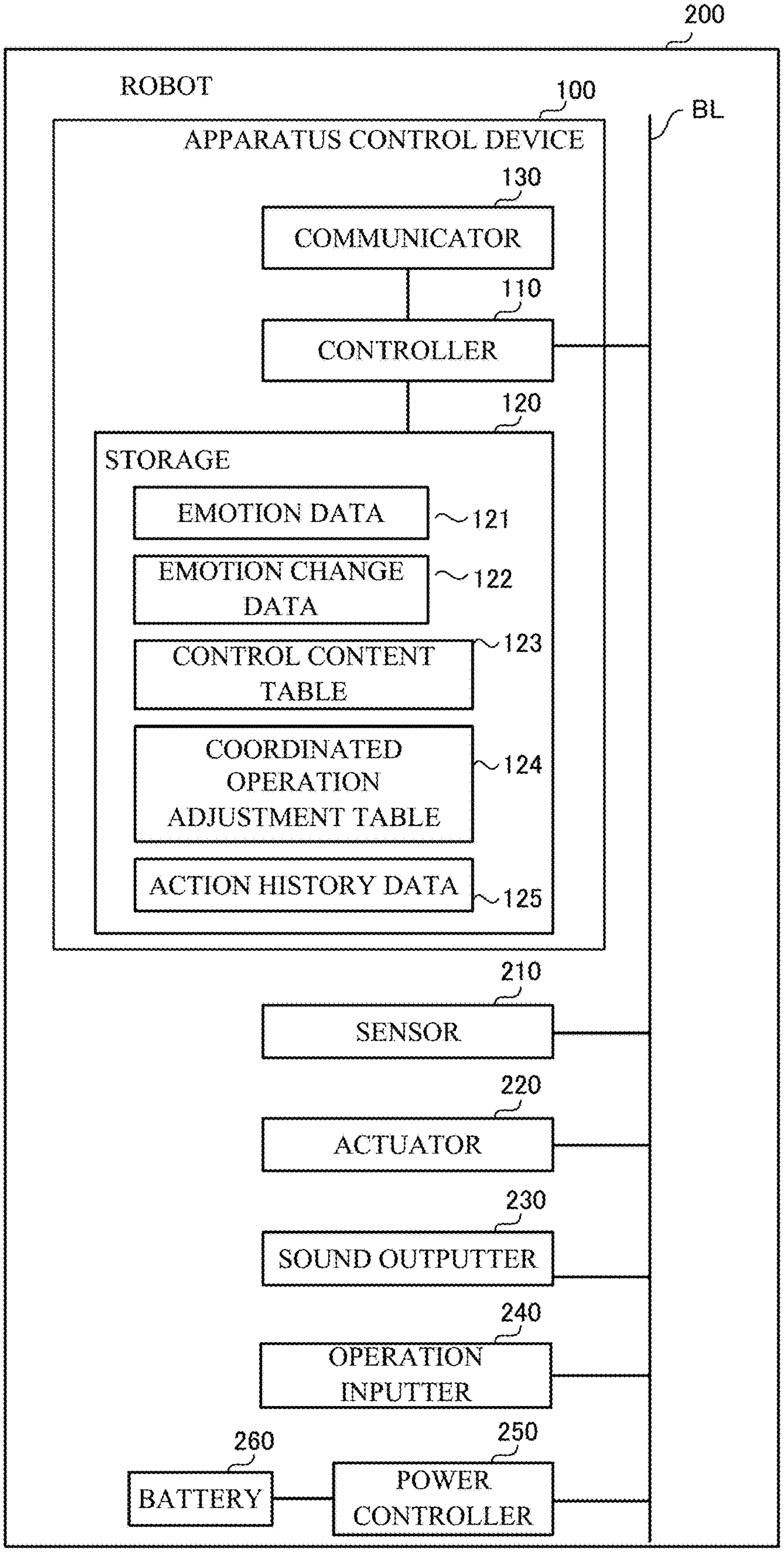
FIG. 4 is a block diagram illustrating a functional configuration of the robot according to the embodiment.

Next, a functional configuration of the robot 200 is described. As illustrated in FIG. 4, the robot 200 includes an apparatus control device 100, a sensor 210, an actuator 220, a sound outputter 230, an operation inputter 240, a power controller 250, and a battery 260. The apparatus control device 100 includes a controller 110, a storage 120, and a communicator 130. In FIG. 4, the apparatus control device 100 is connected to the sensor 210, the actuator 220, the sound outputter 230, the operation inputter 240, and power controller 250 via a bus line BL, but this is merely an example. The apparatus control device 100 may be connected to the sensor 210, the actuator 220, the sound outputter 230, the operation inputter 240, and power controller 250 via a wired interface such as a universal serial bus (USB) cable or the like, or by a wireless interface such as Bluetooth (registered trademark) or the like. In addition, the controller 110 may be connected to the storage 120 and the communicator 130 via the bus line BL.

The apparatus control device 100 controls the actions of the apparatus (robot 200) using the controller 110 and the storage 120. Note that the robot 200 is a device that is controlled by the apparatus control device 100 and, as such, is also called a "control target device."

In one example, the controller 110 is configured by at least one processor such as a central processing unit (CPU) or the like, and executes various kinds of processing described later using programs stored in the storage 120. The controller 110 is compatible with a multithreading function that executes a plurality of processes in parallel. As such, the processor 110 can execute the various types of processing described later in parallel. The controller 110 also has a clock function and a timer function, and can measure the date and time, and the like.

The storage 120 includes at least one memory, and examples of the at least one memory include a read-only memory (ROM), a flash memory, a random access memory (RAM), and the like. The ROM preliminarily stores programs to be executed by the CPU of the controller 110 and data necessary for execution of the programs. The flash memory is a writable non-volatile memory and stores data that is desirably to be saved even after power-off. The RAM stores data created or modified during execution of the program. In one example, the storage 120 stores emotion data 121, emotion change data 122, a control content table 123, a coordinated action adjustment table 124, activity history data 125, and the like, all of which are described later.

The communicator 130 includes a communication module compatible with short-range wireless communication such as Bluetooth (registered trademark), and performs data communication with an external device, such as a smartphone and an electronic musical instruments around the robot 200, other robots of the same type as this robot 200, etc. The communicator 130 may communicate with the external device and the like by wired connection.

The sensor 210 includes the touch sensor 211, the acceleration sensor 212, the gyrosensor 213, the microphone 214, the illuminance sensor 215, and the position sensor 216 as described above. The controller 110 acquires, as external stimulus data, detection values detected by the various sensors included in the sensor 210. The external stimulus data expresses an external stimulus acting on the robot 200. The sensor 210 may include sensors other than the touch sensor 211, the acceleration sensor 212, the gyrosensor 213, the microphone 214, the illuminance sensor 215, and the position sensor 216. The types of external stimuli acquirable by the controller 110 can be increased by increasing the types of sensors of the sensor 210. For example, the sensor 210 may include an image acquirer such as a charge-coupled device (CCD) image sensor, or the like. In this case, the controller 110 can recognize an image acquired by the image acquirer and determine who a person present around the robot 100 is (for example, an owner of the robot 100, a person who always takes care of the robot 100, a stranger, etc.)

The touch sensor 211 detects contacting by some sort of object. The touch sensor 211 includes, for example, a pressure sensor or an electrostatic capacitance sensor. The controller 110 acquires a contact strength and/or a contact time based on the detection values from the touch sensor 211 and, based on these values, can detect an external stimulus such as that the robot 200 is being pet or being struck by the user, and the like (for example, see Unexamined Japanese Patent Application Publication No. 2019-217122). The controller 110 may detect these external stimuli by a sensor other than the touch sensor 211 (for example, see Japanese Patent No. 6575637).

The acceleration sensor 212 detects acceleration in three axis directions consisting of a front-back direction (X-axis direction), a width (left-and-right) direction (Y-axis direction), and an up-and-down direction (Z-axis direction) of the torso 206 of the robot 200. The acceleration sensor 212 detects the gravitational acceleration while the robot 200 stands still. The controller 110 can thus detect the current attitude of the robot 200 based on the gravitational acceleration detected by the acceleration sensor 212. For example, if the user is lifting or throwing the robot 200, the acceleration sensor 212 detects an acceleration caused by the travel of the robot 200 in addition to the gravitational acceleration. The controller 110 subtracts the component of gravitational acceleration from the value detected by the acceleration sensor 212 and can thereby detect the action of the robot 200.

The gyrosensor 213 detects angular velocities of the three axes of the robot 200. The controller 110 can determine a rotation state of the robot 200 based on the angular velocities of the three axes. Additionally, the controller 110 can determine a vibration state of the robot 200 based on the maximum values of the angular velocities of the three axes.

The controller 110 can determine the current attitude (horizontal, upside down, upward facing, downward facing, sideways facing, etc.) of the robot 200 based on the angular velocities detected by the gyrosensor 213 and the gravitational acceleration detected by the acceleration sensor 212.

The microphone 214 is a sound acquirer that detects sounds around the robot 200. In a case where the sound detected by the microphone 214 is some sort of performance sound, the controller 110 can acquire characteristics, such as speed (BPM), key, and beat, of the performance sound by analyzing the performance sound. The "performance sound" in the present disclosure is not limited to the sound played by a musical instrument, but also includes some sound with melody and rhythm, rhythmic hand-clapping sound, singing sound, etc. emitted from external devices, such as a smartphones and PCs. Also, in a case where the external device emitting the performance sound has a performance information transmission function, the controller 110 can receive performance information from the external device via the communicator 130 and acquire BPM, key, beat, etc. from the performance information.

The actuator 220 includes the twist motor 221 and the vertical motor 222, and is driven by the controller 110. The controller 110 controls the actuator 220 and, as a result, the robot 200 can express actions such as, for example, lifting the head 204 up (rotating upward around the second rotational axis), twisting the head 204 sideways (twisting/rotating to the right or to the left around the first rotational axis), and the like. Control data (motion data) for performing these actions are stored in the storage 120, and the actions of the robot 200 are controlled based on the detected external stimulus, the emotion data 121 described later, and the like.

The controller 110 controls the actuator 220 by executing the performance coordination processing, so as to repeatedly execute the performance coordinated action at a cycle corresponding to the BPM of the performance sound while the microphone 214 detects the performance sound. The control data for the performance coordinated action is previously stored in the storage 120. Then, here, the controller 110 adjusts the control content of the performance coordinated action in accordance with the situation of the robot 200 and the situation around the robot 200. The "situation" of the robot 200 here is assumed to include the "state" of the robot 200 such as emotion, personality, etc. The performance coordination processing is described later in detail.

The description given above is an example of the actuator 220. The actuator 220 may be movement means such as a wheel, a crawler, or the like. Additionally, the robot 200 may include parts such as arms, legs, a tail, or the like, and the actuator 220 may be configured to move these parts (arms, legs, tail, or the like). Due to the actions of the actuator 220, positional relationships between the parts such as the head 204, the arms, the legs, and the tail and the torso 206 of the housing 207 change.

The sound outputter 230 includes a speaker 231 that outputs a sound when the controller 110 inputs sound data into the sound outputter 230. For example, when the controller 110 inputs animal sound data of the robot 200 to the sound outputter 230, the robot 200 emits a simulated animal sound. This animal sound data is also stored in the storage 120 as control data (sound effect data), and an animal sound is selected based on the detected external stimulus, the emotion data 121 described later, and the like.

The operation inputter 240 includes, for example, an operation button and a volume knob. The operation inputter 240 is an interface for receiving an operation by a user (owner or borrower), for example, power on/off and volume adjustment of output sound. Note that a configuration is possible in which, in order to further enhance a sense of lifelikeness, the robot 200 includes only a power switch as the operation inputter 240 on the inside of the exterior 201, and does not include operation buttons, the volume knob, and the like other than the power switch. In such a case as well, operations such as adjusting the volume of the robot 200 can be performed using an external smartphone or the like connected via the communicator 130.

The power controller 250 performs power control such as charging of the battery 260 of the robot 200, power supply from the battery 260 to each component, etc.

The functional configuration of the robot 200 is described above. Next, the emotion data 121, the emotion change data 122, the control content table 123, the coordinated action adjustment table 124, and the activity history data 125, which are data stored in the storage 120, are described in order.

Figure 5:
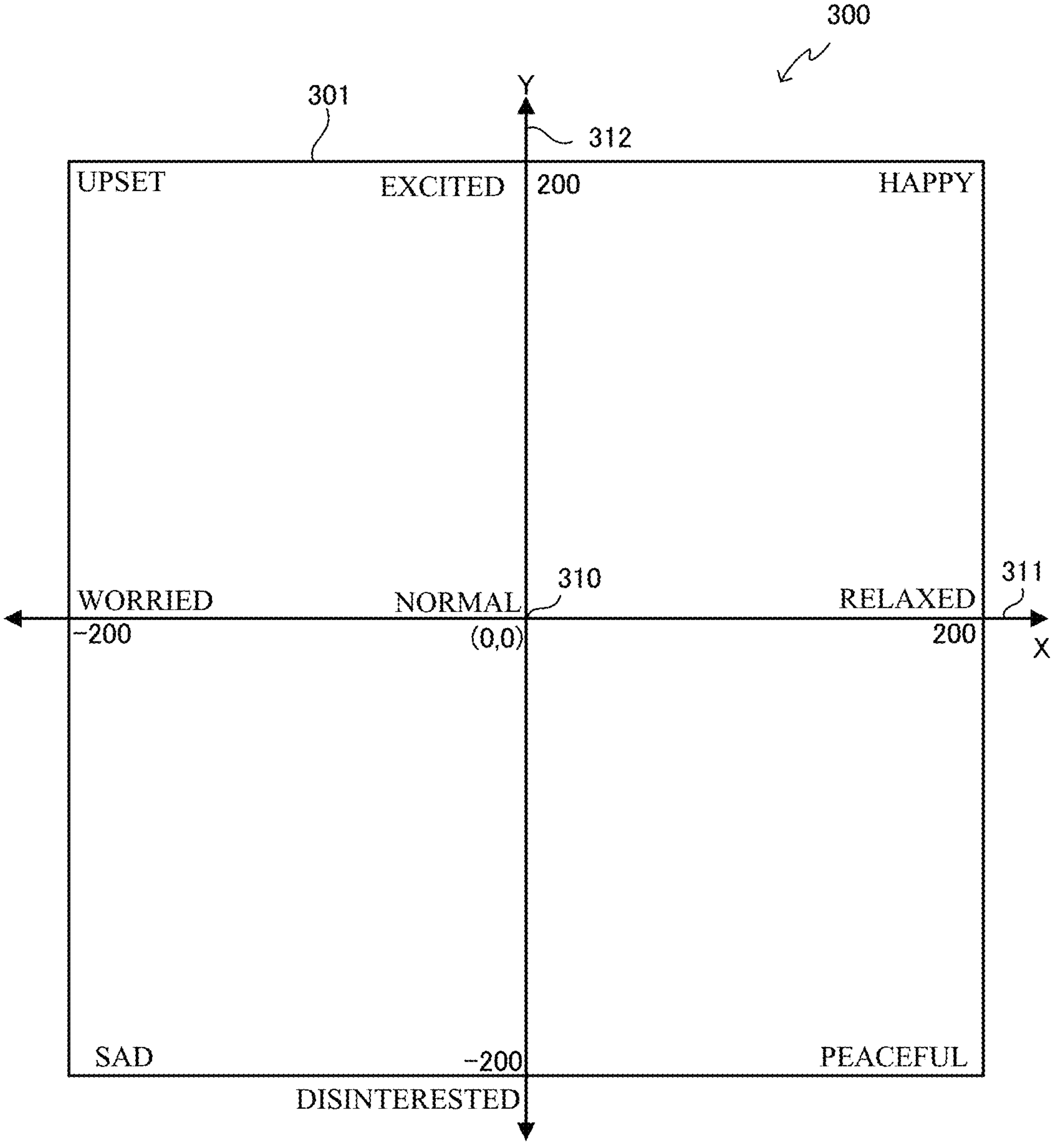
FIG. 5 is a diagram for explaining an example of an emotion map according to the embodiment.

The emotion data 121 is data for imparting pseudo-emotions to the robot 200, and is data (X, Y) that represents coordinates on an emotion map 300. As illustrated in FIG. 5, the emotion map 300 is expressed in a two-dimensional coordinate system having a degree of relaxation (degree of worry) axis as the X axis 311 and a degree of excitement (degree of disinterest) axis as the Y axis 312. An origin 310 (0, 0) on the emotion map 300 represents an emotion in the normal time. As the absolute value of a positive X coordinate value (X value) increases, the robot 250 has an emotion at a higher degree of relaxation. As the absolute value of a positive Y coordinate value (Y value) increases, the robot 250 has an emotion at a higher degree of excitement. As the absolute value of a negative X value increases, the robot 250 has an emotion at a higher degree of worry. As the absolute value of a negative Y value increases, the robot 250 has an emotion at a higher degree of disinterest. The X value and the Y value are limited and cannot take values outside of a frame 301 illustrated in FIG. 5. Thus, the maximum and the minimum of the X value is 200 and −200, respectively, and the maximum and the minimum of the Y value is 200 and −200, respectively. Although the emotion map 300 is expressed in a two-dimensional coordinate system in FIG. 5, the number of dimensions of the emotion map 300 is arbitrary.

Here, in the present embodiment, the emotion of the robot 200 whose X value on the emotion map 300 is equal to or higher than a predetermined value is defined as "relaxed", and the emotion of the robot 200 whose X value on the emotion map 300 is equal to or lower than the predetermined value is defined as "worried". Similarly, the emotion of the robot 200 whose Y value on the emotion map 300 is equal to or higher than a predetermined value is defined as "exited", and the emotion of the robot 200 whose Y value on the emotion map 300 is equal to or lower than the predetermined value is defined as "disinterested". The emotion of the robot 200 whose X value and a Y value on the emotion map 300 are equal to or higher than a predetermined value is defined as "happy", and the emotion of the robot 200 whose X value and a Y value on the emotion map 300 are equal to or lower than the predetermined value is defined as "sad". The emotion of the robot whose X value on the emotion map 300 is equal to or higher than a predetermined value and whose Y value on the emotion map 300 is equal to or less than the predetermined value is defined as "peaceful", and the emotion of the robot 200 whose X value on the emotion map 300 is equal to or lower than the predetermined value and whose Y value on the emotion map 300 is equal to or higher than the predetermined value is defined as "upset". The emotion of the robot 200 having an X value and a Y value other than the above is defined as "normal". The above is one of examples, and how the pseudo-emotion of the robot 200 is defined can be determined as desired.

The emotion change data 122 are data that sets an amount of change that increases or decreases each of the X value and the Y value of the emotion data 121. In the present embodiment, as emotion change data 122 corresponding to the X of the emotion data 121, DXP that increases the X value and DXM that decreases the X value are provided and, as emotion change data 122 corresponding to the Y value of the emotion data 121, DYP that increases the Y value and DYM that decreases the Y value are provided. Specifically, the emotion change data 122 includes the following four variables, and is data expressing degrees to which the pseudo-emotions of the robot 200 are changed.

DXP: tendency to get relaxed (variability of the X value to the positive direction in the emotion map 300)

DXM: tendency to get worried (variability of the X value to the negative direction in the emotion map 300)

DYP: tendency to get excited (variability of the Y value to the positive direction in the emotion map 300)

DYM: tendency to get disinterested (variability of the Y value to the negative direction in the emotion map 300)

In the present embodiment, an example is described in which the initial value of each of these variables is set to 10, and the value increases to a maximum of 20 by processing for learning emotion change data 122 in action control processing, described later. Since the training processing causes the emotion change data 122, that is, degrees to which emotion changes, to change, the robot 200 is to have various characters in accordance with how the user interacts with the robot 200 and the characteristics of the detected performance sound.

Here, in the present embodiment, the pseudo-personality of the robot 200 whose DXP expressing the tendency to get relaxed is equal to or higher than a predetermined value is defined as "chipper". Hereinafter, the pseudo-personality of the robot 200 whose DXM expressing the tendency to get worried is equal to or higher than the predetermined value is defined as "shy", the pseudo-personality of the robot 200 whose DYP expressing the tendency to get excited is equal to or higher than the predetermined value is defined as "active", and the pseudo-personality of the robot 200 whose DYM expressing the tendency to get disinterested is defined as "spoiled". The above is one of examples, and any method can be employed to define how the pseudo-personality of the robot 200 from each type of value of the emotion change data 122.

As illustrated in FIG. 6, control conditions and control data are associated with each other and stored in the control content table 123. When a control condition is satisfied (for example, some sort of external stimulus is detected), the controller 110 controls the actuator 220 and the sound outputter 230 based on the corresponding control data (motion data for expressing an action by the actuator 220, and sound effect data for outputting a sound effect from the sound outputter 230).

As illustrated in FIG. 6, the motion data is a series of sequence data for controlling the actuator 220 (arranged as "Time (ms): Rotational angle (degree) of vertical motor 222: Rotational angle (degree) of twist motor 221"). For example, when the body is petted, the controller 110 controls the actuator 220 so that, firstly (at 0 sec), the rotational angles of the vertical motor 222 and the twist motor 221 are set to 0 degrees (vertical reference angle and twist reference angle), at 0.5 sec, the head 204 is raised so that the rotational angle of the vertical motor 222 becomes 60 degrees, and at 1 sec, the head 204 is twisted so that the rotational angle of the twist motor 221 becomes 60 degrees.

Although, in FIG. 6, a text explaining each sound effect data is described to facilitate understanding, in fact, the sound effect data themselves (the sampled sound data) explained by these texts are stored in the control content table 123 as sound effect data. While not illustrated in FIG. 6, the control content table 123 is assumed to store the aforementioned control data of the performance coordinated action.

In the control content table 123 illustrated in FIG. 6*a* condition related to emotion (expressed by the coordinates on the emotion map 300) is not included in the control condition, but, as an example, a condition related to emotion may be included in the control condition and the control data may be changed in accordance with the emotion. Also, as another example, a condition related to personalities (expressed by the values of the emotion change data 122) may be included in the control condition of the control content table 123, and the control data may be changed in accordance with the personality. This makes it possible to control actions of the robot 200 in accordance with the emotion (emotion data 121) and personality (emotion change data 122) of the robot 200 changed based on the characteristics of the performance sound in the motion control processing and the performance coordination processing described below.

The coordinated action adjustment table 124 is a table in which control coefficients are set to adjust the control content of the performance coordinated action in accordance with the situation of the robot 200 or the situation around the robot 200. The coordinated action adjustment table 124 is described in detail with specific examples in the description of the performance coordination processing described later.

The activity history data 125 is log data in which the history of actions, experiences, states, etc. of the robot 200 are registered along with their date and time information. For example, the location information of the robot 200, the pseudo-sleep time (wake-up time, bedtime, etc.), characteristics (BPM, tone, etc.) and detection time of the performance sound detected by the microphone 214 are registered as a history in the activity history data 125.

Next, the action control processing executed by the controller 110 of the apparatus control device 100 is described with reference to the flowchart illustrated in FIG. 7. The action control processing is processing in which the controller 110 controls the actions (motion, animal sound, or the like) of the robot 200 based on detection values from the sensor 210 or the like. When the user operates the operation inputter 240 of the robot 200 to turn on the power, execution of a thread of this action control processing is started in parallel with other required processing. As a result of the action control processing, the actuator 220 and the sound outputter 230 are controlled such that the motion of the robot 200 is expressed, sound effects such as animal sounds and the like are output, and the like. Also, the activity history data 125 is updated as appropriate, by processing in a separate thread for action registration, in accordance with actions of the robot 200 in the actin control processing, detection of the performance sound, etc.

First, the controller 110 initializes various types of data such as emotion data 121 and emotion change data 122 (step S101).

Next, the controller 110 determines whether or not the action mode of the robot 200 is a sleep mode (step S102). In a case where the action mode is a sleep mode (Yes in step S102), the processing proceeds to step S105.

In a case where the action mode is not a sleep mode (No in step S102), the controller 110 determines whether or not the robot 200 satisfies a bedtime condition (step S103). For example, the controller 110 determines that the bedtime condition is satisfied in a case where the brightness around the robot 200 detected by the illuminance sensor 215 remains below a threshold for a certain period of time or more (e.g., 15 minutes or more). The manner in which the bedtime condition is set is not limited thereto. For example, even if the brightness around the robot 200 remains below the threshold for a certain period of time, a determination may be made that the bedtime condition is not satisfied in a case where the external stimulus is acquired by the sensor 21 or a sound with a volume higher than the threshold is detected. Alternatively, a bedtime range such as 10:00 μm to 12:00 pm can be set in advance, and a determination may be made that the bedtime condition is satisfied in a case where the current time is behind a time randomly selected within the bedtime range.

In a case where the robot 200 satisfies the bedtime condition (Yes in step S103), the controller 110 sets the action mode of the robot 200 to the sleep mode (step S104). Upon the setting to the sleep mode, the controller 110 causes the robot 200 to take an action like a creature being asleep. For example, the controller 110 controls the actuator 220 to put the robot 200 into a curled-up state or to take a breathing action that makes it appear as if the robot 200 is breathing with a longer breath cycle than when the robot 200 is awake. Also, the time when the sleep mode is set is used as the bedtime of the robot 200 for that day, and the activity history data 125 is updated with the time.

Next, the controller 110 determines whether or not the robot 200 satisfies the preset wake-up condition (step S105). For example, the controller 110 determines that the wake-up condition is satisfied in a case where the brightness around the robot 200 detected by the illuminance sensor 215 remains above a threshold for a certain period of time or more (e.g., 15 minutes or more). The manner in which the wake-up condition is set is not limited thereto. For example, even if the brightness around the robot 200 is not above the threshold, a determination may be made that the wake-up condition is satisfied in a case where the external stimulus is acquired by the sensor 21 or a sound above the threshold is detected. Alternatively, a wake-up time range such as 6:00 am to 8:00 am can be set in advance, and a determination may be made that the wake-up condition is satisfied in a case where the current time is behind the time randomly selected from the wake-up time range.

In a case where the robot 200 does not satisfy the wake-up condition (No in step S105), performance response processing, etc. described later are skipped since the robot 200 is in a pseudo-sleep, and then the processing proceeds to step S115.

In a case where the robot 200 satisfies the wake-up condition (Yes in step S105), the controller 110 turns off the sleep mode of the robot 200 (step S106). Upon the sleep mode being turned off, the controller 110 causes the robot 200 to take an action like waking up. For example, the controller 110 controls the actuator 220 to release the robot 200 from the curled-up state or output a wake-up sound from the microphone 214. Also, the time when the sleep mode is turned off is used as the wake-up time for that day, and the activity history data 125 is updated with the time.

Next, in a case where there is a performance sound around the robot 200, the controller 110 executes the performance coordination processing that causes the robot 200 to operate in response to the performance sound (step S107). The performance coordination processing is described later in detail.

Next, the controller 110 determines whether or not the external stimulus is acquired by the sensor 210 (step S108). In a case where a determination is made that the external stimulus is acquired (Yes in step S108), the controller 110 acquires the emotion change data 122 that is to be added to or subtracted from the emotion data 121 in accordance with the external stimulus (step S109). When, for example, petting of the head 204 is detected as the external stimulus, the robot 200 obtains a pseudo sense of relaxation and, as such, the controller 110 acquires DXP as the emotion change data 122 to be added to the X value of the emotion data 121.

Moreover, the controller 110 sets the emotion data 121 in accordance with the emotion change data 122 acquired in step S109 (step S110). When, for example, DXP is acquired as the emotion change data 122 in step S105, the controller 110 adds the DXP of the emotion change data 122 to the X value of the emotion data 121. However, in a case where addition of the emotion change data 122 causes the value (X value or Y value) of the emotion data 121 to exceed the maximum value of the emotion map 300, the value of the emotion data 121 is set to the maximum value of the emotion map 300. In a case where subtraction of the emotion change data 122 causes the value of the emotion data 121 to be less than the minimum value of the emotion map 300, the value of the emotion data 121 is set to the minimum value of the emotion map 300.

In steps S109 and S110, any type of settings are possible for the type of emotion change data 122 acquired and the emotion data 121 set for each individual external stimulus. Examples are described below.

The head 204 is petted (relaxed): X=X+DXP

The head 204 is struck (worried): X=X−DXM (these external stimuli can be detected by the touch sensor 211H of the head 204)

The torso 206 is petted (excited): Y=Y+DYP

The torso 206 is struck (disinterested): Y=Y−DYM (these external stimuli can be detected by the touch sensor 211H of the torso 206)

Held with head upward (pleased): X=X+DXP and Y=Y+DYP

Suspended with head downward (sad): X=X−DXM, and Y=Y−DYM (these external stimuli can be detected by the touch sensor 211 and the acceleration sensor 212)

Spoken to in kind voice (peaceful): X=X+DXP and Y=Y−DYM

Yelled out in loud voice (upset): X=X−DXM and Y=Y+DYP (these external stimuli can be detected by the microphone 214)

Next, controller 110 references the control content table 123 and acquires the control data corresponding to the control condition that is satisfied by the acquired external stimulus (step S111).

Then, the controller 110 starts up a control data playback thread, and plays back the control data acquired in step S111 (step S112). The control data playback thread is a thread for only playing back the control data (controlling the actuator 220 based on the motion data, and outputting sound from the sound outputter 230 based on the sound effect data). However, by executing the control data playback thread in a thread separate from the action control processing, the action control processing can proceed in parallel even in a case where the robot 200 is acting based on the control data. Then, the processing proceeds to step S115.

In a case where a determination is made that the external stimulus is not acquired (No in step S108), the controller 110 determines whether to take a spontaneous action such as a breathing action that creates the impression that the robot 200 is breathing, or the like, by periodically driving the actuator 220 at a certain rhythm (step S113). Any method may be used as the method for determining whether to take the spontaneous action and, in the present embodiment, it is assumed that the determination of step S113 is "Yes" and the breathing action is taken every breathing cycle (for example, 2 seconds).

When a determination is made to take the spontaneous action (Yes in step S113), the controller 110 executes the spontaneous action (e.g., the breathing action) (step S114), and executes step S115.

When a determination is made to not take the spontaneous action (No in step S113), the controller 110 uses a built-in clock function to determine whether or not a date has changed (step S115). When a determination is made that the date has not changed (No in step S115), the processing by the controller 110 returns to step S102.

When a determination is made that the date has changed (Yes in step S115), the controller 110 executes learning processing of the emotion change data 122 based on the external stimulus acquired on the day (a day before change of the date) (step S116). Specifically, the learning processing of the emotion change data 122 here is processing for increasing the corresponding emotion change data 122 when the value of the emotion data 121 reaches the minimum value or the maximum value of the emotion map 300 even once in step S110 of that day. For example, when the X value of the emotion data 121 is set to the maximum value of the emotion map 300 even once, 1 is added to the DXP of the emotion change data 122, when the Y value is set to the maximum value of the emotion map 300 even once, 1 is added to the DYP, when the X value is set to the minimum value of the emotion map 300 even once, 1 is added to the DXM, and when the Y value is set to the minimum value of the emotion map 300 even once, 1 is added to the DYM. However, when the various values of the emotion change data 122 become excessively large, the amount of change at one time of the emotion data 121 becomes excessively large and, as such, the maximum values of the various values of the emotion change data 122 are set to 20, for example, and are set so as not to increase therebeyond.

Next, the controller 110 learns the emotion change data 122 based on the performance sound detected on that day (the day before the date changes) (step S117). For example, the controller 110 increases the DXP and the DYP or either of the DXP or the DYP by a predetermined amount in a case where a total detection time (major detection time) of a major performance sound on that day registered in the activity history data 125 is equal to or higher than a threshold. This allows the pseudo-personality of the robot 200 to change toward "chipper" or "active" by listening to the bright major performance sound. Similarly, the controller 110 increases the DXM and the DYM or either of the DXM or the DYM by a predetermined amount in a case where a total detection time (minor detection time) of a minor performance sounds on the day registered in the activity history data 125 is equal to or higher than the threshold. This allows the pseudo-personality of the robot 200 to change toward "shy" or "spoiled" by listening to the dark minor performance sound. The method for learning the emotion change data from the detected performance sound is not limited to the above example, and various methods can be employed. For example, when the major detection time is longer by comparison between the major detection time and the minor detection time for that day, the controller 110 may increase the DXP and the DYP by a predetermined amount, and when the minor detection time is longer by the comparison, the controller 110 may increase the DXM and DYM by a predetermined amount. Each value of the emotion change data 122 may be changed by a predetermined amount in accordance with a ration between the major detection time and the minor detection time.

Then, the controller 110 initializes both the X value and the Y value of the emotion data 121 to be zero (step S118) and the processing returns to step S102.

Next, the performance coordination processing executed in step S107 of the action control processing (FIG. 7) is described with reference to FIG. 8.

Firstly, the controller 110 determines whether or not any performance is started around the robot 200 (step S201). Specifically, in a case where the controller 110 can determine from a detection value of the microphone 214 that a sound with a volume equal to or higher than a threshold continues for a predetermined period of time or longer (e.g., 30 seconds or longer), the controller 110 determines that the performance is started, and otherwise determines that the performance is not started. The controller 110 may determine that the performance is not started in a case where the controller 110 can determine that the sound is an environmental sound or noise after analysis of the sound even in a situation where the sound with the volume equal to or higher than the threshold continues for a predetermined period of time or longer. The method for determining whether or not a performance is started is not limited to the above method, but any method can be employed.

Figure 7:
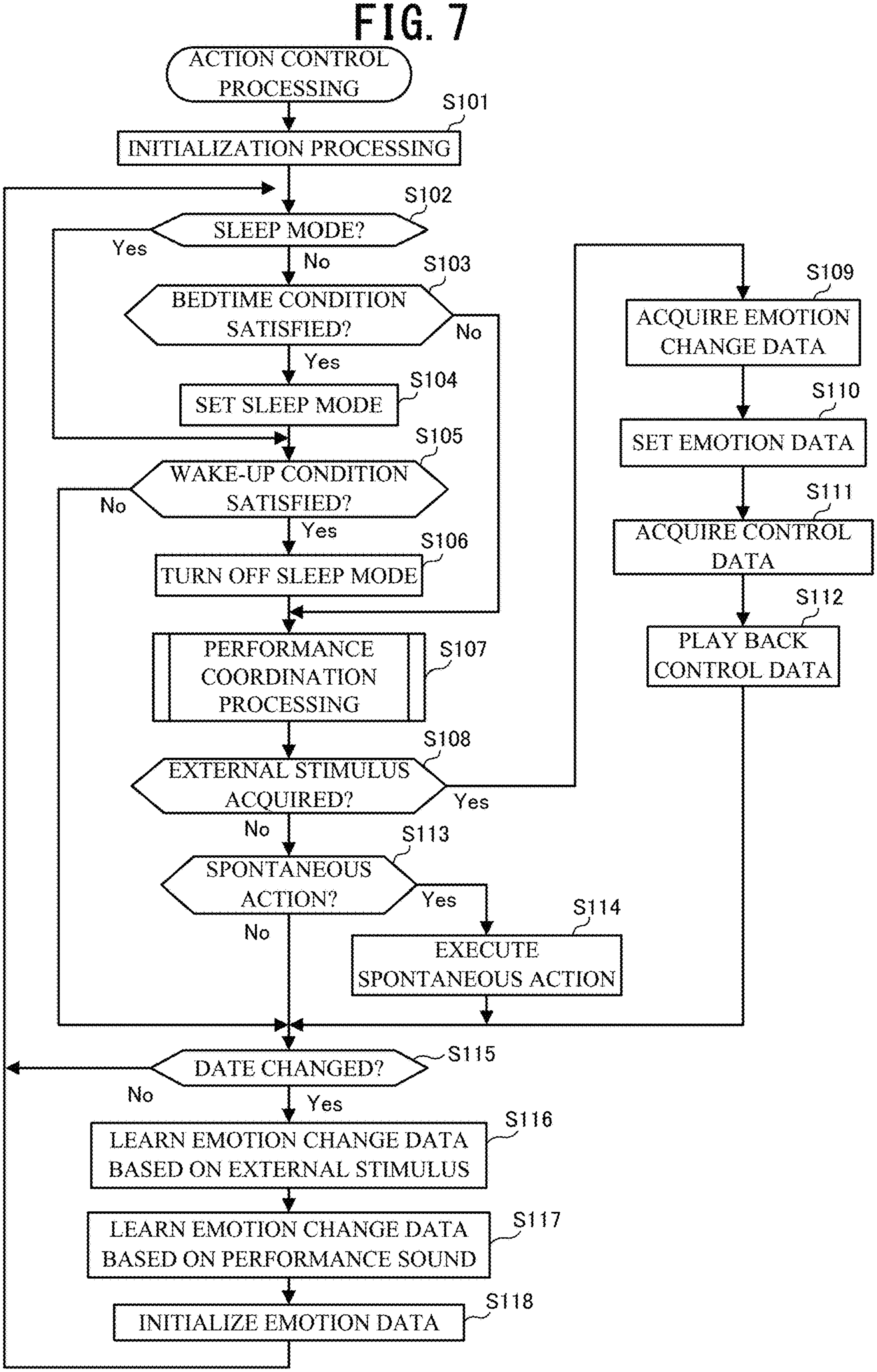
FIG. 7 is a flowchart of action control processing according to the embodiment.

In a case where the performance is not started (No in step S201), the performance coordination processing ends and processing proceeds to step S108 of the action control processing (FIG. 7). In a case where the performance is started (Yes in step S201), the controller 110 executes performance information acquisition processing to acquire performance information, such as BPM and key (minor or major), of the performance sound (step S202). The performance information acquisition processing is described in detail later.

Next, the controller 110 sets the emotion data of the robot 200 in accordance with the acquired key of the performance sound (step S203). For example, in a case of major key, the controller 110 adds the DXP of the emotion change data to the X value of the emotion data and adds the DYP of the emotion change data to the Y value of the emotion data, thereby changing the pseudo-emotion of the robot 200 toward the happy emotion. In a case of minor key, the controller 110 subtracts the DXM of the emotion change data from the X value of the emotion data and subtracts the DYM of the emotion change data from the Y value of the emotion data, thereby changing the pseudo-emotion of the robot 200 toward the sad emotion. If the controller 110 cannot determine whether the key is major or minor, the controller 110 does not have to change the emotion change data. The above is one of examples, and how the emotion data is set in accordance with the acquired key can be determined as desired. Alternatively, the emotion data may be set by adding or subtracting a fixed value to or from the X value and the Y value of the emotion data, without using the emotion change data.

Next, the controller 110 calculates constancy of the performance speed from the acquired BPM (step S204). Specifically, the controller 110 determines an average value of the BPMs repeatedly acquired in step S202 of the performance. The controller 110 then calculates, as constancy of the performance speed, a matching degree (matching rate) between the average value of the BPMs and the most recently acquired BPM. Immediately after start of the performance, the number of BPM acquisitions is small and an error in the average value is relatively large. Thus, the processing of step S204 and step S205 described later may be skipped until a lapse of a predetermined time after start of the performance coordination processing, and the processing may proceeds to step S206.

Next, the controller 110 sets an emotion parameter of the robot 200 based on the calculated constancy of the performance speed (step S205). Specifically, in a case of the performance speed having a 80% or higher constancy, the controller 110 adds the DXP of the emotion change data to the X value of the emotion data and adds the DYP of the emotion change data to the Y value of the emotion data, thereby changing the pseudo-emotion of the robot 200 toward the happy emotion. In a case of the performance speed having a 30% or less constancy, the controller 110 subtracts the DXM of the emotion change data from the X value of the emotion data and subtracts the DYM of the emotion change data from the Y value of the emotion data, thereby changing pseudo-emotion of the robot 200 toward the sad emotion. The above is one of examples, and how the emotion data is set in accordance with the acquired constancy of the performance speed can be determined as desired. For example, in a case of the performance speed having a 30% or less constancy, the controller 110 subtracts the DXM of the emotion change data from the X value of the emotion data and adds the DYP of the emotion change data to the Y value of the emotion data, thereby changing the pseudo-emotion of the robot 200 to toward the upset emotion. Also, the X value and the Y value of the emotion data may be added in a case where the 80% or higher constancy of the performance speed is calculated a predetermined consecutive times or more or calculated at a predetermined frequency or more. Similarly, the X value and the Y value of the emotion data may be subtracted in a case where the 30% or less constancy of the performance speed is calculated a predetermined consecutive times or more or calculated at a predetermined frequency or more.

Next, the controller 110 determines a current situation of the robot 200 and a current situation around the robot 200 (step S206). Specifically, the controller 110 determines the following items (1) to (7) as the current situations of the robot 200.

(1) Pseudo-Emotion

The controller 110 determines as the situation of the robot 200 the current pseudo-emotion of the robot 200 based on the X value and the Y value indicated by the emotion data 121 by identifying the current pseudo-emotion as one of "relieved", "worried", "excited", "uninterested", "happy", "sad", "relieved", "upset", and "normal".

(2) Pseudo-Personality

The controller 110 determines as the situation of the robot 200 the current pseudo-personality of the robot 200 based on the value of the emotion change data 122 by identifying the current pseudo-personality as one of "chipper", "shy", "active", and "spoiled".

(3) Remaining Battery Level

The controller 110 acquires the remaining level of the battery 260 from the power controller 250 as the situation of the robot 200.

(4) Attitude

The controller 110 determines as the situation of the robot 200 the current attitude of the robot 200 based on detection values of the touch sensor 211, the acceleration sensor 212, and the gyrosensor 213. Specifically, the controller 110 identifies the attitude of the robot 200 as one of "upside-down", where the head 204 is down, "flipped", where the torso is turned over, "cuddled", where the robot is being held and petted by the user.

(5) Location

The controller 110 determines as the situation of the robot 200 the current location of the robot 200 based on detection values of the position sensor 216. Specifically, the controller 110 identifies the location of the robot 200 based on the location information detected by the position sensor 216 as "home" in a case where the robot 200 is determined as being at home that is a pre-registered location or in a location frequently registered in the activity history data 125. Furthermore, in a case where the robot 200 is not at "home", the controller 110 identifies the location of the robot 200 with reference to the frequency registered in the activity history data 125 as one of "familiar place", where the robot 200 has visited more than five times, "unfamiliar place", where the robot 200 has visited only less than 5 times, and "first-time place", where the robot has never visited before.

(6) Time

The controller 110 identifies as the situation of the robot 200 the current time as one of "just after wake-up", "before sleep", and "naptime" of the robot 200. For example, the controller 110 identifies the current time as "just after wake-up" when the current time is within 30 minutes after a today's wake-up time registered in the activity history data 125. The controller 110 identifies the current time as "before sleep" when the current time is within 30 minutes before a today's estimated bedtime, which is estimated based on the daily bedtime registered in the activity history data 125. Similarly, the controller 110 identifies the current time as "naptime" when the current time is within a today's estimated naptime, which is estimated based on the activity history data 125.

(7) Pseudo-Emotion of Nearby Robot

In a case where there is another similar type of robot (hereinafter referred to as a nearby robot) having communication capabilities in the vicinity, the controller 110 acquires as the external situation of the robot 200 the pseudo-emotion of the nearby robot by data communication with the nearby robot by the communicator 130.

Next, the controller 110 refers to the coordinated action adjustment table 124 illustrated in FIG. 9 and calculates a control coefficient of the performance coordinated action based on the various situations of the robot 200 acquired in step S206 (step S207). The performance coordinated action is a predetermined specific action that is repeatedly executed in a cycle corresponding to the BPM of the performance sound. The performance coordinated action is a combination of left and right rotation of the head 204 driven by the twist motor 221 and up and down movement of the head 204 driven by the vertical motor 222. For example, if the BPM is 60, the twist motor 221 and the vertical motor 222 are controlled to execute performance coordinated actions repeatedly 60 times per minute, or once per second. This can control the robot 200 to act as if the robot 200 is coordinated with the performance sound.

The control coefficients of the performance coordinated actions are factors for adjusting the movements of such performance coordinated actions in accordance with the situations of the robot 200. The control coefficients of the performance coordinated actions include an up-down movement amount coefficient, an up-down speed coefficient, a left-right movement amount coefficient, a left-right speed coefficient, and a timing coefficient.

The up-down movement amount coefficient indicates how much an amount of up-down movement of the head 204 in the performance coordinated action is increased or decreased compared with the amount in the normal time without adjustment. For example, the "+0.1" up-down movement amount coefficient means a 10% increase in the amount of up-down movement of the head 204 in the performance coordinated action compared with the amount in the normal time, and the "−0.1" up-down movement amount coefficient means a 10% decrease in the amount of up-down movement of the head 204 in the performance coordinated action compared with the amount in the normal time.

The up-down speed coefficient indicates how much a speed of up-down movement of the head 204 in the performance coordinated action is increased or decreased compared with the amount in the normal time without adjustment. For example, the "+0.1" up-down speed coefficient means a 10% increase in a speed of up-down movement of the head 204 in the performance coordinated action compared with the speed in the normal time, and the "−0.1" up-down speed coefficient means a 10% decrease in the speed of up-down movement of the head 204 in the performance coordinated action compared with the speed in the normal time.

The left-right movement amount coefficient indicates how much an amount of left-right rotation of the head 204 in the performance coordinated action is increased or decreased compared with the amount in the normal time without adjustment. For example, the "+0.1" left-right movement amount coefficient means a 10% increase in an amount of left-right rotation of the head 204 in the performance coordinated action compared with the amount in the normal time, and the "−0.1" left-right movement coefficient means a 10% decrease in the amount of left-right rotation of the head 204 in the performance coordinated action compared with the amount in the normal time.

The left-right speed coefficient indicates how much a speed of left-right rotation of the head 204 in the performance coordinated action is increased or decreased compared with the speed in the normal time without adjustment. For example, the "+0.1" left-right speed coefficient means a 10% increase in a speed of left-right rotation of the head 204 in the performance coordinated action compared with the speed in the normal time, and the "−0.1" left-right speed coefficient means a 10% decrease in the speed of left-right rotation of the head 204 in the performance coordinated action compared with the speed in the normal time.

The timing coefficient indicates how much earlier or later the performance coordinated action is to be executed than in the normal time without adjustment. For example, the "+0.1" timing coefficient means a 10% earlier execution of the performance coordinated action than in the normal time, and the "−0.1" timing coefficient means a 10% later execution of the performance coordinated action than in the normal time.

In step S207, the controller 110 refers to the coordinated action adjustment table 124 illustrated in FIG. 9 and acquires the control coefficient corresponding to the determined situation of the robot 200.

For example, in the coordinated action adjustment table 124 illustrated in FIG. 9, in a case where the emotion of the robot 200 is "happy", an overall positive control coefficient is set, resulting in a performance coordinated action that is larger and faster than normal. Also, in a case where the emotion of the robot 200 is "sad" or "disinterested", an overall negative control coefficient is set, resulting in a performance coordinated action that is smaller and slower than normal.

In the coordinated action adjustment table 124 illustrated in FIG. 9, in a case where the personality of the robot 200 is "chipper" or "active", an overall positive control coefficient is set, resulting in a performance coordinated action that is larger and faster than normal. Also, in a case where the personality of the robot 200 is "shy" or "spoiled", an overall negative control coefficient is set, resulting in a performance coordinated action that is smaller and slower than normal.

In the coordinated action adjustment table 124 illustrated in FIG. 9, in a case where the remaining level of battery of the robot 200 is "30% or less", an overall negative control coefficient is set, resulting in a performance coordinated action that is smaller and slower than normal. This allows the robot 200 to appear sluggish in movement due to lack of energy.

In the coordinated action adjustment table 124 illustrated in FIG. 9, in a case where the location of the robot 200 is a "rarely visited place" or a "first visited place", an overall negative control coefficient is set, resulting in a performance coordinated action that is smaller and slower than normal. This allows the robot 200 to appear nervous and sluggish in movement due to being in an unfamiliar place.

In the coordinated action adjustment table 124 illustrated in FIG. 9, in a case where the current time is "after wake-up", "naptime", or "before sleep", an overall negative control coefficient is set, resulting in a performance coordinated action that is smaller and slower than normal. This allows the robot 200 to appear sluggish in movement due to drowsiness.

In practice, multiple situations of the robot 200 are acquired. Thus, in step S207, the controller 110 refers to the coordinated action adjustment table 124 to identify the corresponding control coefficient for each situation of the robot 200 and calculate the final control coefficient for the coordinated action by summing values of these control coefficients. For example, it is assumed that the emotion "happy", the battery remaining level "30% or less", and the nearby robot's emotion "upset" are determined as the situations of the robot 200. In this case, the coefficients corresponding to the emotion "happy" that are specified from the coordinated action adjustment table 124 are the "+0.2" up-down speed coefficient, the "+0.2" up-down movement amount coefficient, the "+0.2" left-right speed coefficient, the "+0.2" left-right movement amount coefficient, and the "+0" timing coefficient. Also, the coefficients corresponding to the battery remaining level "30% or less" that are specified from the coordinated action adjustment table 124 are the "−0.1" up-down speed coefficient, the "−0.1" up-down movement amount coefficient, the "−0.1" left-right speed coefficient, the "−0.1" left-right movement amount coefficient, and the "−0.1" timing coefficient. Also, the coefficients corresponding to the nearby robot's emotion "upset" that are specified from the coordinated action adjustment table 124 are the "+0.1" up-down speed coefficient, the "+0" up-down movement amount coefficient, the "+0.2" left-right speed coefficient, the "+0" left-right movement amount coefficient, and the "+0" timing coefficient. Then, by summing these values, the "+0.2" up-down speed coefficient, the "+0.1" up-down movement amount coefficient, the "+0.3" left-right speed coefficient, the "+0.1" left-right movement amount coefficient, and the "−0.1" timing coefficient are calculated as the final control coefficient. Alternatively, instead of such summing in a case where multiple situations of the robot 200 are specified, a control coefficient corresponding to a single randomly selected situation may be calculated, or only a control coefficient for the highest priority situation based on priorities set for different situations may be calculated.

In the coordinated action adjustment table 124 illustrated in FIG. 9, the control coefficients are set in accordance with emotions of the nearby robot. However, even in a case where the emotion of the nearby robot is detected, control efficient may be calculated from the emotion of the nearby robot only when the personality of the robot 200 is "shy" or "spoiled", which is easily influenced by the surroundings, or only when the place of the robot 200 is the "first-visited place", which is easily influenced by the surroundings. In a case where there are multiple nearby robots and multiple emotions are detected, control coefficients may be calculated from the coordinated action adjustment table 124 considering all the emotions, control coefficients may be calculated from the most frequently detected emotions, or control coefficients may be calculated from the emotions of the most nearby robot. Also, control coefficients may be calculated considering not only the emotions of the nearby robot but also the personalities.

Figure 8:
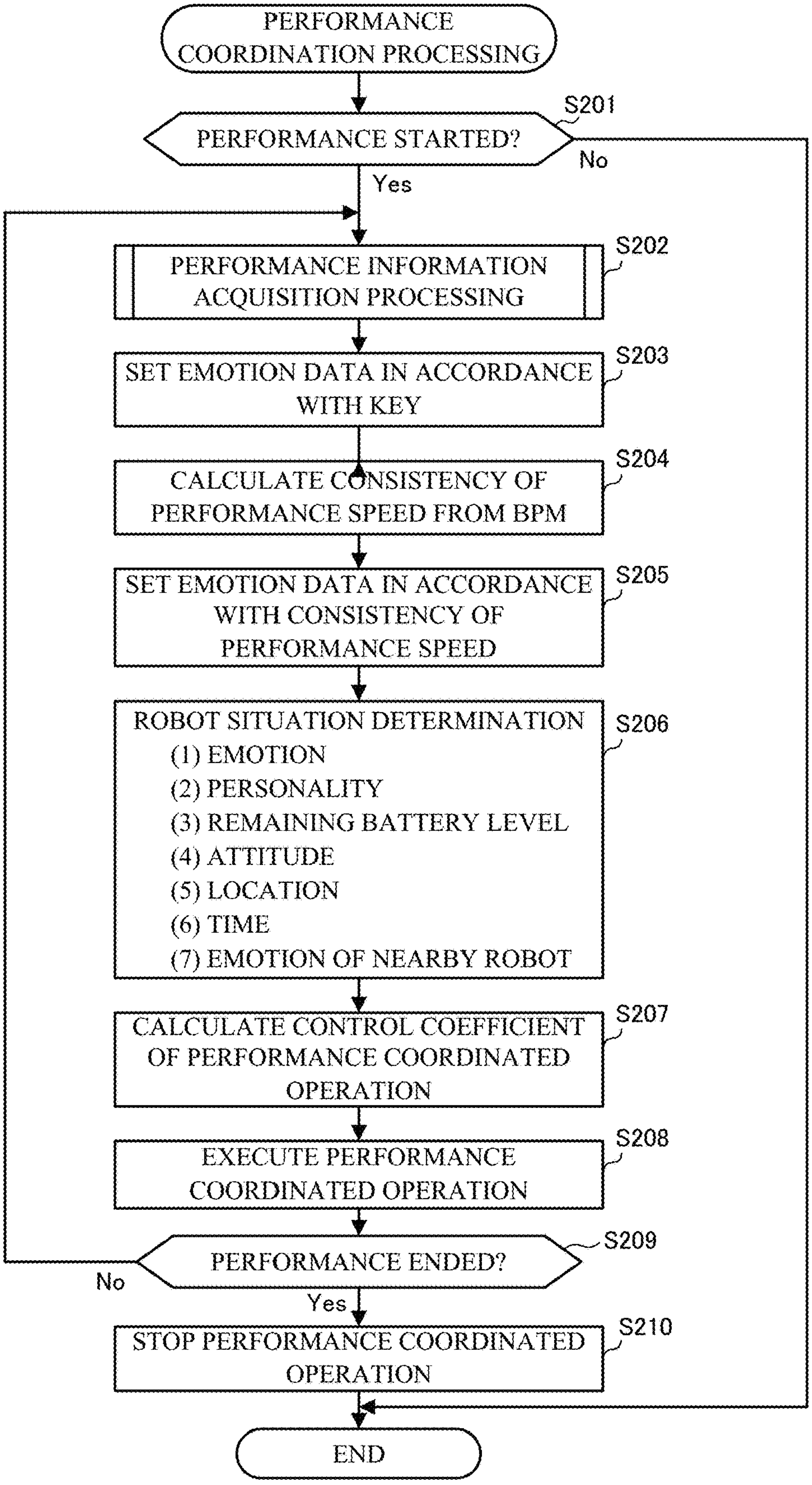
FIG. 8 is a flowchart of performance coordination processing according to the embodiment.

Returning to the flowchart in FIG. 8, the controller 110 controls the actuator (twist motor 221 and vertical motor 222) to repeatedly execute the performance coordinated action adjusted by the control coefficients of the coordinated action calculated in step S207 at intervals corresponding to the BPM of the performance sound acquired in step S202 (step S208).

Next, the controller 110 determines whether or not the performance has ended (step S209). For example, the controller 110 may determine that the performance has ended in a case where the microphone 214 does not detect a sound of volume equal to or higher than a threshold for a predetermined time or longer (e.g., 10 seconds or longer).

In a case where the performance has not ended (No in step S209), the processing returns to step S202. In a case where the performance has ended (Yes in step S209), the controller 110 stops the performance coordinated action being executed (step S210), the performance coordination processing ends, and then the processing proceeds to step S108 of the action control processing (FIG. 7).

Figure 10:
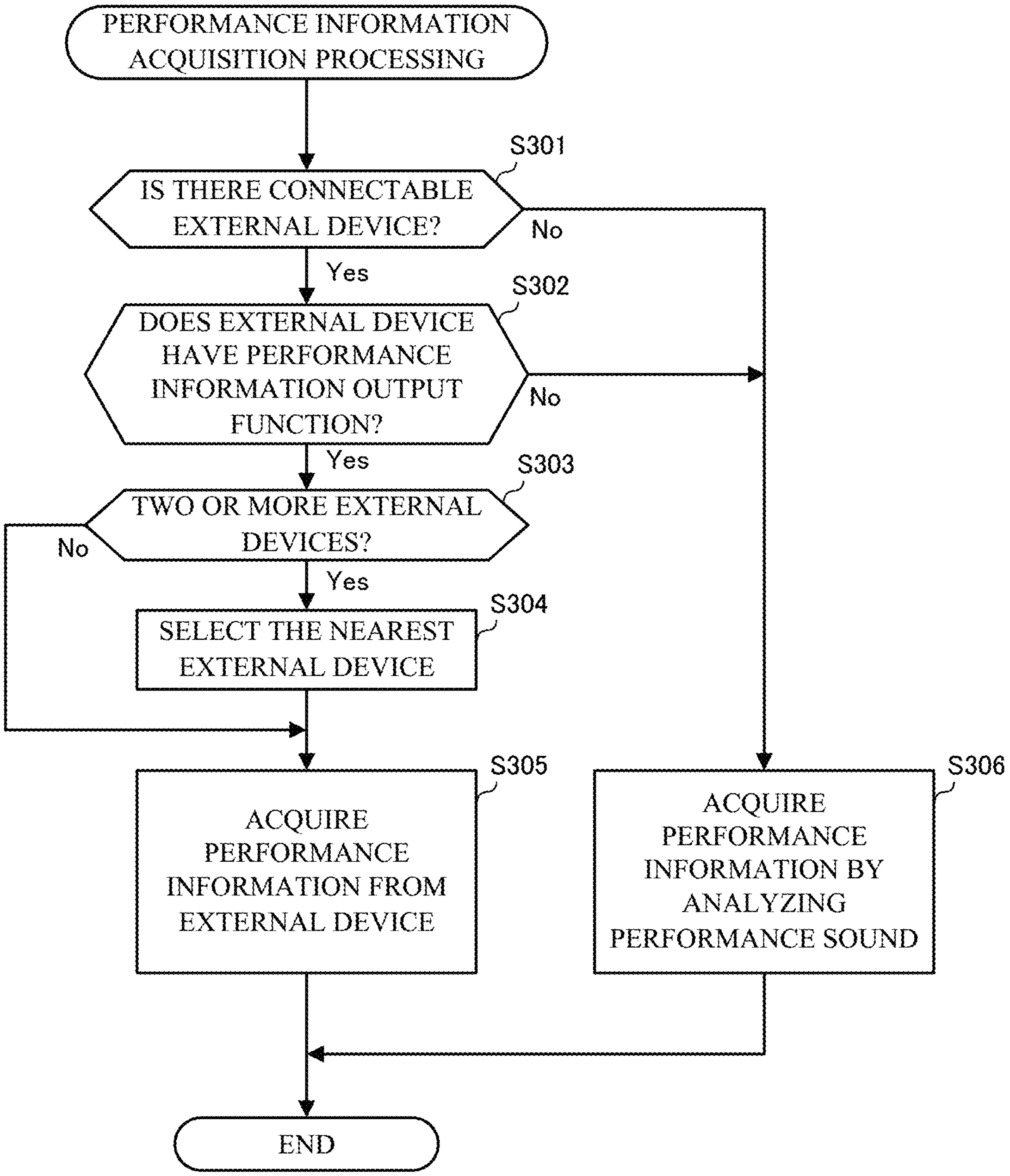
FIG. 10 is a flowchart of performance information acquisition processing according to the embodiment.

Next, the performance information acquisition processing executed in step S202 of the performance coordination processing (FIG. 8) is described with reference to FIG. 10.

First, the controller 110 determine whether or not there is a connectable external device using a communication search function of the communicator 130 (step S301). In a case where there is an external device (Yes in step S301), the controller 110 determines whether or not that external device has a performance information output function (step S302). For example, the controller 110 can determine whether or not the external device has a performance information output function by comparing the identification information (e.g., model number, name) of devices with the performance information output function previously stored in the storage 120 with the identification information acquired from the connectable external device.

In a case where the external device has a performance information output function (Yes in step S302), the controller 110 determines whether or not there are a plurality of external devices having the performance information output function (step S303).

In a case where there are a plurality of external devices having the performance information output function (Yes in step S303), the controller 110 select one external device 1 that is nearest to the robot 200 from among the plurality of external devices (step S304). For example, the controller 110 can specify the external device nearest to the robot 200 by receiving the location information from each external device.

In a case where there is only one external device having the performance information output function (No in step S303) or after the nearest external device is selected in step S304, the controller 110 acquires via the communicator 130 the performance information of the performance sound currently played on this external device (step S305). This performance information includes information representing at least BPM and key (major or minor) of the performance sound. Then the processing proceeds to step S203 of the performance coordination processing.

In a case where there is no connectable external device (No in step S301) or none of the external devices have a performance information output function (No in step S302), the controller 110 acquires the performance information, such as BPM and key (step S306), by analyzing the performance sound continuously acquired by the microphone 214. For example, the controller 110 acquires the BPM by analyzing the performance sound and measuring a time interval of the volume peak. Also, the controller 110 can analyze frequencies of the performance sound to determine a scale of the performance sound and determine whether the key is minor or major from the scale. Then the processing proceeds to step S203 of the performance coordination processing.

As described above, according to the present embodiment, the situation of the robot 200 or the situation around the robot 200 is determined by the performance coordination processing, and when executing coordination action that causes the robot 200 to execute the coordinated action that is coordinated with the performance sound based on BPM, the movement amount, speed, and timing of the coordinated action are adjusted in accordance with the determined situation. This enables coordinated actions reflecting the situations and enables devices that react to sounds to operate in a variety of patterns.

According to the present embodiment, in the performance coordination processing, the robot 200 not only reacts to the performance sound but also changes the pseudo-emotions of the robot 200 in accordance with the characteristics of the performance sound (key, speed constancy), enabling the device reacting to the sound to operate so as to make the user feel a sense of lifelikeness like a real pet.

According to the present embodiment, when the microphone 214 acquires the performance sound, the performance information is acquired via the communicator 130 from the external device in a case where the communicator 130 can communicate with the external device having the performance information transmission function, and the performance sound acquired by the microphone 214 is analyzed to acquire the performance information in a case where the communicator 130 cannot communicate with the external device. Thus, the performance information can be always acquired using the most appropriate method without burdening the user.

According to the present embodiment, in a case where a plurality of such external devices are detected, the performance information is acquired from the external device that is nearest to the robot 200. Thus, the performance information can be acquired from the external device who is likely outputting the performance sound at the highest output relative to the robot 200.

MODIFICATION EXAMPLE

The above-described embodiments should not be construed as limiting the present disclosure and may receive various modifications and applications.

For example, in the above-described embodiment, the coordinated action that is coordinated with the performance sound is basically one type, and the coordinate operation is executed by changing movements, speed, and the like of the coordinated action based on various situations of the robot 200. However, multiple types of coordinated actions may be used. However, the control content table 123 may define multiple types of coordinated actions based on time signatures, such as duple measure, triple measure, and quadruple measure. In the performance coordination processing, the time signature of the performance sound may be determined based on changes in the peak volume of the performance sound, and the coordinated action for the determined time signature, with various situations of the robot 200 reflected thereon, may be executed on the robot 200. Additionally, coordinated actions for different BPM ranges (e.g., coordinated action for low tempo, coordinated action for high tempo) or coordinated actions for different genres of performance based on the performance sounds (e.g., coordinated action for classical music, coordinate action for pop music) may be executed.

In the above-described embodiment, the situations of the robot 200 or the situations around the robot 200 for determining the control coefficients for coordinated action include (1) pseudo-emotion, (2) pseudo-personality, (3) battery remaining level, (4) attitude, (5) location, (6) time, and (7) pseudo-emotion of nearby robots. However, these are merely examples, and the conditions of the robot 200 to be determined are not limited thereto. For example, fewer types of situations may be determined, or more types of situations may be determined. It is necessary to prepare a coordinated action adjustment table 124 corresponding to the types of situations to be determined.

Additionally, the user's reactions may be reflected in the performance coordinated action executed by the robot 200 in the performance coordination processing (FIG. 8). Specifically, in a case where the sensor 210 detects a user's reaction praising the robot 200 (e.g., vocal praise such as "Well done" or actions like petting the robot 200), a predetermined positive value is added to the up-down movement amount coefficient and the up-down speed coefficient of the control coefficient calculated in step S207, and then the performance coordinated action of step S208 is executed. Alternatively, in a case where the sensor 210 detects a user's reaction praising the robot 200, the X and Y values of the emotion data 121 are increased, changing the personality toward "happy". This enables the robot 200 executing the performance coordinated action to have more pronounced movements of the performance coordinated action each time the user praises the robot 200, making the user feel a sense of lifelikeness like a real pet.

In the above embodiment, the physical movement of the head 204 of the robot 200 is described as the performance coordinated action, but the performance coordinated action is not limited to physical movements. For example, the operation of outputting a specific animal sound from the sound outputter 230 may be included in the performance coordinated action. In this case, control coefficients representing how much louder or quieter the sound should be compared with usual, and coefficients representing whether the timing of the animal sound should be earlier or later than usual, can be set in the coordinated action adjustment table 124, allowing the animal sound output in the performance coordinated action to change in accordance with the determined situations.

Figure 11:
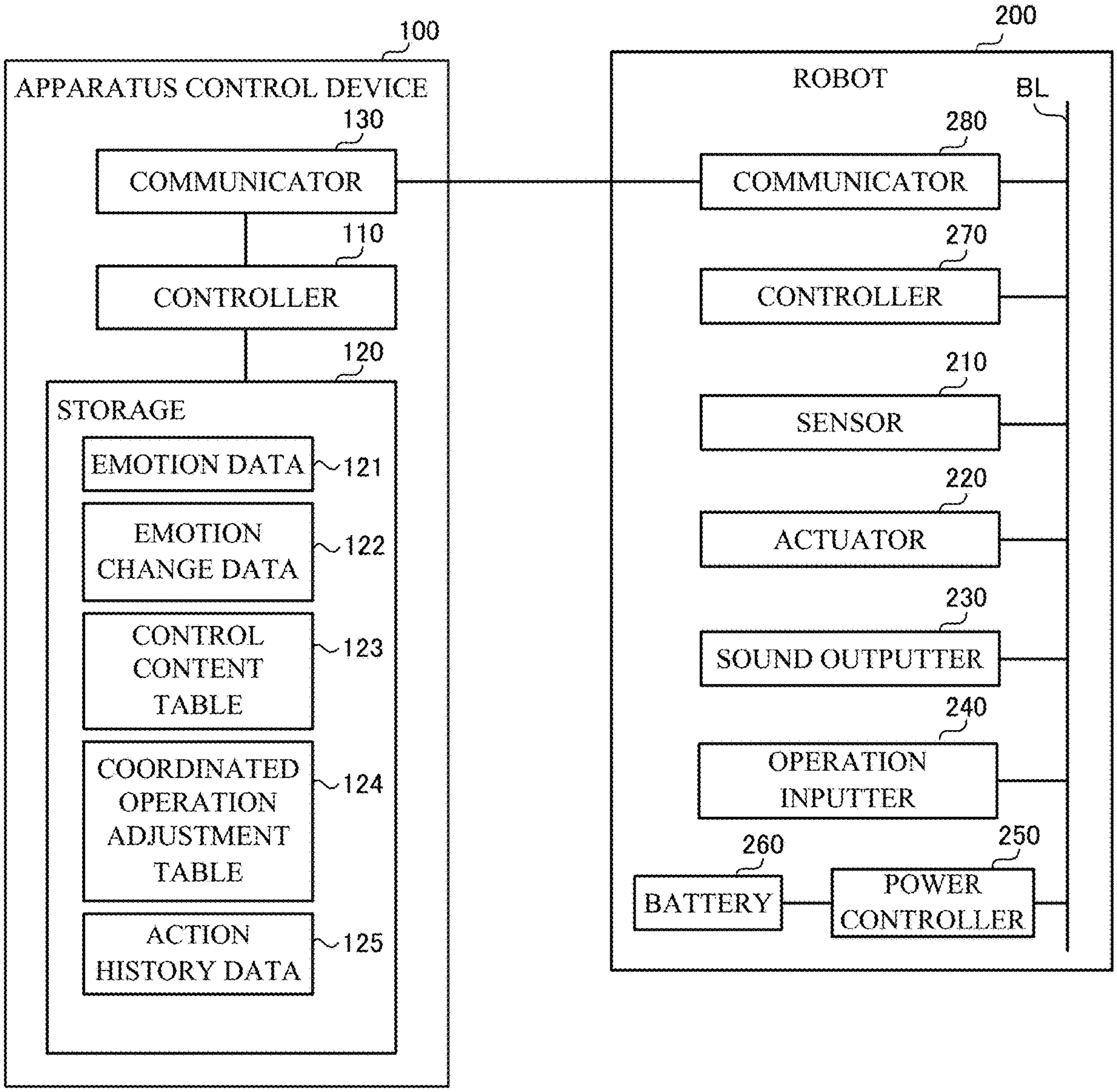
FIG. 11 is a block diagram illustrating functional configurations of a robot and an apparatus control device according to a modified example.

In the above-described embodiment, the configuration in which the apparatus control device 100 that controls the robot 200 is built into the robot 200 (FIG. 4) is described, but the apparatus control device 100 that controls the robot 200 does not necessarily have to be built into the robot 200. For example, as illustrated in FIG. 11, the apparatus control device 100 is configured as a separate device from the robot 200, with the robot 200 having its own controller 270 and communicator 280 separate from the controller 110 and communicator 130 of the apparatus control device 100. In this case, the communicator 130 and the communicator 280 are configured to transmit and receive data between each other, and the controller 110 can acquire external stimuli detected by the sensor 210 and control the actuator 220 and the sound outputter 230 via the communicator 130 and the communicator 280.

Additionally, in the above-described embodiment, the apparatus to be controlled by the apparatus control device 100 is described as the robot 200, but the apparatus to be controlled by the apparatus control device 100 is not limited to the robot 200. For example, the apparatus control device 100 may control toys or other apparatuses as control targets.

In the above-described embodiments, the operation program executed by the CPU of the controller 110 is described as being stored in the ROM or the like of the storage 120 in advance. However, the present disclosure is not limited thereto, and a configuration is possible in which the action programs for executing the above-described various types of processing described above are installed on an existing general-purpose computer or the like, thereby causing that computer to function as a device corresponding to the apparatus control device 100 according to the embodiments described above.

These programs may be provided by any procedure. For example, the programs may be stored for distribution in a non-transitory computer-readable recording medium, such as a flexible disk, a compact disc read-only memory (CD-ROM), a digital versatile disc read-only memory (DVD-ROM), a magneto-optical (MO) disc, a memory card, or a USB memory. Alternatively, the programs may be stored in a storage on a network, such as the Internet, and may be downloaded into a computer.

If the above-described processing is shared by an operating system (OS) and an application program or achieved by cooperation between the OS and the application program, only the application program may be stored in a non-transitory recording medium or a storage. Alternatively, the program may be superimposed on a carrier wave and distributed via a network. For example, the programs may be posted to a bulletin board system (BBS) on a network, and distributed via the network. In this case, the program may be configured to be able to execute the above-explained processes when activated and executed under the control of the OS as well as other application programs.

Additionally, a configuration is possible in which the controller 110 is constituted by a desired processor unit such as a single processor, a multiprocessor, a multi-core processor, or the like, or by combining these desired processors with processing circuitry such as an application specific integrated circuit (ASIC), a field-programmable gate array (FPGA), or the like.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

The invention claimed is:

1. A robot control device for controlling a robot, the robot control device comprising:

at least one processor configured to:

determine a characteristic of a performance sound around the robot;

determine a constancy of a performance speed based on a comparison between an average value of beats per minute of the performance sound and current beats per minute of the performance sound;

update a parameter indicating a pseudo-emotion of the robot based at least in part on the constancy of the performance speed; and when causing the robot to execute a performance coordinated action based on the determined characteristic of the performance sound, cause the performance coordinated action to reflect the pseudo-emotion indicated by the parameter after the update.

2. The robot control device according to claim 1, wherein the at least one processor is configured to update the parameter indicating the pseudo-emotion of the robot based at least in part on at least one of a pseudo-personality, a battery remaining level, an attitude, and a place, of the robot, a current time, and a situation of another same type of robot that is located nearby.

3. The robot control device according to claim 1, wherein the at least one processor is configured to change at least a timing of the performance coordinated action in accordance with the pseudo-emotion indicated by the parameter after the update.

4. The robot control device according to claim 1, wherein the at least one processor is configured to change at least one of a movement amount and a speed of the performance coordinated action in accordance with the pseudo-emotion indicated by the parameter after the update.

5. The robot control device according to claim 1, wherein the at least one processor is configured to determine a tempo of the performance sound as the characteristic of the performance sound.

6. The robot control device according to claim 1, wherein the at least one processor is further configured to:

determine a key of the performance sound as a major key or a minor key, and update the parameter indicating the pseudo-emotion of the robot based at least in part on the determined key.

7. The robot control device according to claim 1, wherein the characteristic of the performance sound around the robot comprises at least one of beats per minute of the performance sound or a key of the performance sound.

8. The robot control device according to claim 1, wherein the at least one processor is configured to determine that the performance sound is present around the robot in a case where a sound having a volume equal to or greater than a threshold continues for a predetermined period of time.

9. The robot control device according to claim 1, wherein the at least one processor is configured to update the parameter indicating the pseudo-emotion of the robot based on whether the constancy of the performance speed is greater than or equal to a first threshold or less than or equal to a second threshold.

10. A robot control method for controlling a robot, the robot control method comprising:

determining a characteristic of a performance sound around the robot;

determining a constancy of a performance speed based on a comparison between an average value of beats per minute of the performance sound and current beats per minute of the performance sound;

updating a parameter indicating a pseudo-emotion of the robot based at least in part on the constancy of the performance speed; and when causing the robot to execute a performance coordinated action based on the determined characteristic of the performance sound, cause the performance coordinated action to reflect the pseudo-emotion indicated by the parameter after the update.

11. A non-transitory recording medium storing a program, the program causing a computer to execute processing comprising:

determining a characteristic of a performance sound around a robot;

determining a constancy of a performance speed based on a comparison between an average value of beats per minute of the performance sound and current beats per minute of the performance sound;

updating a parameter indicating a pseudo-emotion of the robot based at least in part on the constancy of the performance speed; and when causing the robot to execute a performance coordinated action based on the determined characteristic of the performance sound, cause the performance coordinated action to reflect the pseudo-emotion indicated by the parameter after the update.

* * * * *